United States Patent Office 3,520,497
Patented July 14, 1970

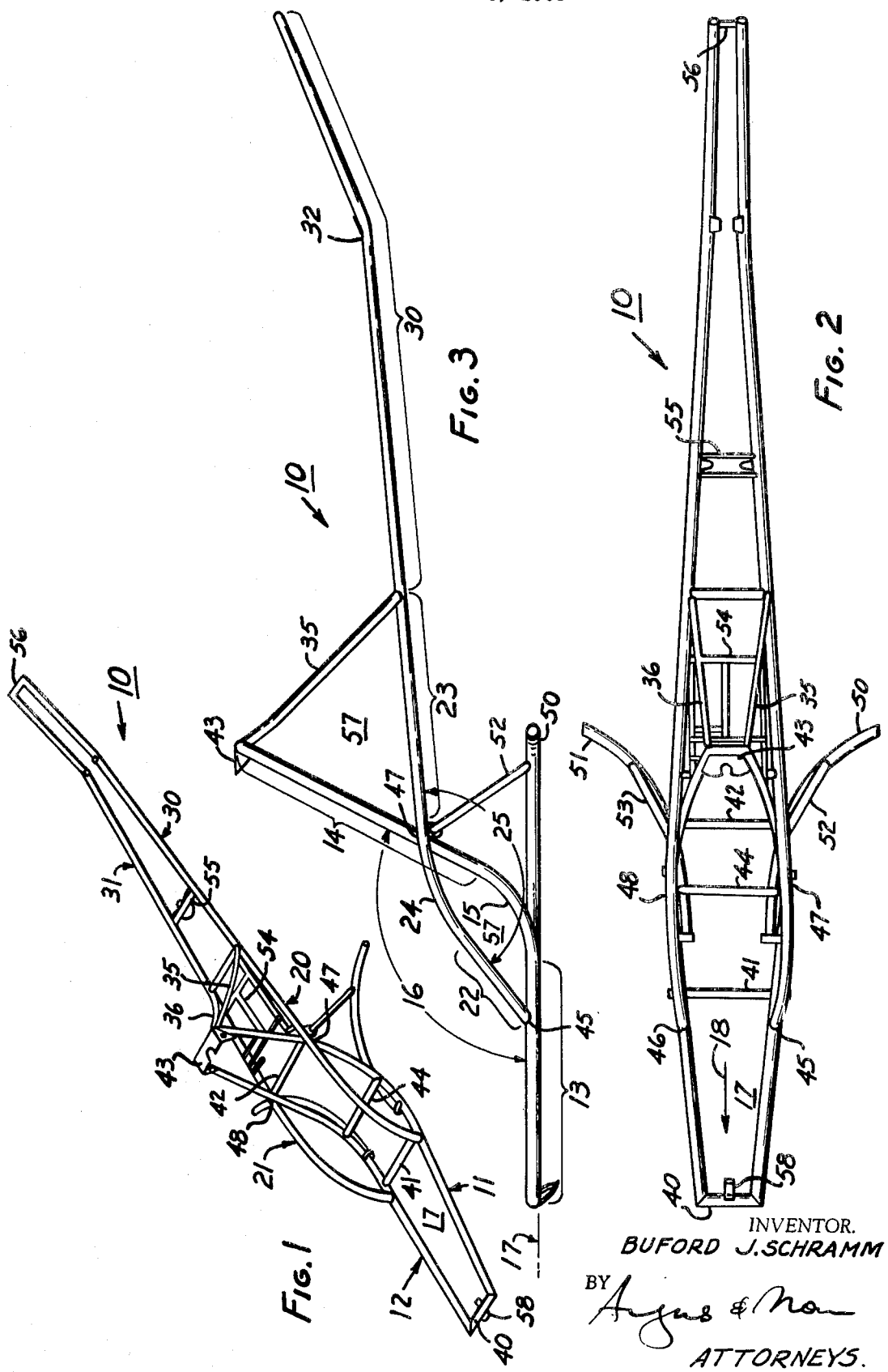

3,520,497
FRAMEWORK FOR A HELICOPTER
Buford J. Schramm, Mesa, Ariz., assignor to Rotorway,
Inc., Mesa, Ariz., a corporation of Delaware
Filed June 5, 1968, Ser. No. 734,638
Int. Cl. B64c 1/06
U.S. Cl. 244—17.11    10 Claims

ABSTRACT OF THE DISCLOSURE

This invention relates to a framework for a helicopter. The framework of the invention includes a pair of forward airframe members and a pair of rearward airframe members all of which are bent tubing with leg sections forming an obtuse angle and joined by an arcuate medial section. The framework is generally symmetrical relative to a direction and axis of forward motion. The obtuse angle of the forward airframe member faces upwardly, and that of the rearward airframe member faces downwardly. The forward legs of the forward and rearward airframe members are attached to each other, as are the rearward legs so as to form two side members. The side members are structurally joined together by cross members. A landing gear member is attached to each of the rearward side members and projects therefrom. A tail boom member is attached to each of the rearward airframe members and projects rearwardly therefrom. A brace member joins the rearward legs of the side frame member so as to form a rigid triangular structure for each pair of forward and rearward airframe members.

According to preferred but optional features of the invention, a rotor mounting plate is mounted to and interconnects the forward airframe members, and a power plant mount is attached to and interconnects the rearward airframe members.

---

This invention relates to a framework for a helicopter.

The problem of maximizing the horsepower to gross weight ratio is more severe in helicopters than in many other types of aircraft, and it is a requisite that the gross weight of the air frame be held to a minimum, because each additional pound of gross weight means precisely that much less payload. Concomitantly, structural considerations are quite demanding in helicopters, especially as relates to torsional strength, fatigue resistance, general structure integrity, and the ability to absorb energy in the event of hard or crash landings.

It is an object of this invention to provide a framework for a helicopter which is especially suitable for, but not limited to, a one-man helicopter which is tough, springy, light of weight, and able to absorb extraordinary loads with minimum damage to the structure and its occupant. The construction includes a minimum number of parts and is readily adapted to the use of bent steel tubing in a welded structure.

A fuselage framework according to this invention comprises a pair of tubular forward airframe members and a pair of tubular rearward airframe members. These members all comprise a continuous tube having a pair of leg sections connected by an arcuate medial section, the legs forming an obtuse angle. The framework has a direction and axis of forward motion and a horizontal reference plane, the framework being generally symmetrical laterally of the said axis. The forward airframe members lie side by side and spaced apart, as do the rearward airframe members. The forward airframe members have their obtuse angles facing upwardly and the rearward airframe members have their obtuse angles facing downwardly. The forward leg sections of each rearward airframe member are attached to the forward leg section of a respective forward airframe member at a location spaced from the forward end of the forward airframe member, and the rearward leg section of the said respective forward and rearward airframe members are attached to each other at locations remote from the ends of the rearward leg sections. A pair of brace members connects the rearward leg sections of the respective forward and rearward airframe members at locations spaced from the said last-named locations, whereby to form a rigid triangular structure with portions of the respective rearward leg sections. A plurality of rigid cross-members are attached to and extend between, and structurally connect and space apart the leg sections of the forward and rearward airframe members. A rearwardly-extending tubular tail boom member is attached to the rearward leg section of each of the rearward airframe members, and a tubular landing gear member is attached to and projects from each of the forward airframe members.

According to a preferred but optional feature of this invention, the brace members are attached to the respective ends of the leg sections, and structure interconnects the ends of the rearward leg sections of the forward airframe member to serve as a rotor mount.

According to still another preferred but optional feature of the invention, all respective leg sections of the pairs of airframe members laterally approach each other as they extend toward their ends remote from the arcuate medial sections.

The above and other features of this invention will be understood from the following detailed description and the accompanying drawings, in which:

FIG. 1 is an oblique view of the presently preferred embodiment of the invention; and FIGS. 2 and 3 are plan and side elevations, respectively, of FIG. 1.

Fuselage framework 10 according to this invention includes a pair of forward airframe members 11, 12. These are symmetrical, so only member 11 will be described in detail. It includes a forward leg section 13 and a rearward leg section 14 joined together by an arcuate medial section 15. The leg sections form between them an obtuse angle 16 which, of course, does not have a physical apex. The forward legs lie in a reference plane 17, which for discussion will be assumed to be horizontal. There is an axis 18 of forward motion which lies in a vertical plane and the airframe is substantially symmetrical on both sides of this axis.

The framework further includes a pair of rearward airframe members 20, 21 which are symmetrical, so only member 20 will be described in detail. It includes a forward leg section 22 and a rearward leg section 23, which leg sections are joined together by an arcuate medial section 24. The leg sections 22 and 23 form an obtuse angle 25.

A pair of tail boom members 30, 31 are respectively joined to rear airframe members 20 and 21, and project rearwardly therefrom. Preferably they are formed from the same length of tubing. A bend 32 is formed in both of them for conveniently positioning a rotor (not shown) which is mounted to the end of the tail boom.

A pair of brace members 35, 36 are respectively connected, such as by welding, to the ends of rearward leg sections 22 and to the upper ends of rearward leg sections 13 so as to form triangular three-link rigid systems as will later be described.

A plurality of cross-members 40, 41, 42 and 43 structurally join, interconnect and space apart the airframe members as shown. They may conveniently be welded in place.

Forward leg sections 13 lie generally in reference plane 17, and rearward leg sections 14 project generally upwardly therefrom. Obtuse angle 16 faces upwardly. Obtuse angle 25 faces downwardly, and the rear airframe members 20 and 21 generally rise from the reference plane and project rearwardly, which rearward projection is continued by the tail boom members.

An additional cross-member 44 joins the arcuate medial sections. Weldments are conveniently formed at locations 45, 46 for joining the forward ends of the rear airframe members to the forward leg sections 13 of the forward airframe members at a point spaced from their leading ends. The airframe members are similarily joined at locations by weldments at locations 47, 48 where the rearward leg sections of both of the airframe members cross.

The cross-members are welded at their intersections with the airframe members. However, it will be noted that they are all joined to the forward airframe members, the connection to the rear airframe members being through the weldments of the airframe members themselves.

Landing gear members 50, 51 are attached such as by clips or bolts to the forward airframe members and lie generally in the reference plane as they bend away from the axis as they extend rearwardly. Landing gear support members 52, 53 join the landing gear to the airframe members. The respective pairs of airframe members 11 and 20, and 12 and 21, are sometimes referred to as side members, and it will be seen that the forward legs and arcuate medial sections of the rearward airframe members form a cockpit structure for a person who may sit within it with his legs extending on supporting structure (not shown) such as a pan and a seat between the forward leg sections of the forward airframe members.

Cross-member 43 is sometimes referred to as a rotor mounting plate and may, instead of being tubular, comprise a plate adapted to support a main rotor. Similarly, a foundation member 54 may be mounted between the rear leg sections of the rear airframe member to provide foundation means for a power plant such as a reciprocating engine.

A pair of cross-members 55, 56 is provided between the tail boom members for structural purposes and for mounting of such accessory drives and the like as may be desired.

Preferably, but not necessarily, the landing gear means will be bolted or otherwise removably attached in order that it can readily be removed in the event of accident or hard landing. It has been found that this member and its support can absorb considerable of the energy resulting from impacting and hard or crash landings to the benefit of the general airframe and its occupant.

The airframe members, tail boom members and brace member and all cross-members, except member 43, may and preferably will, be made of tubing, and the airframe members and tail boom members definitely will be. Steel tubing provides a substantial strength-to-weight ratio, and it will be seen that this generally symmetrical and interconnected structure provides a torsion resistant, simple construction of a minimum number of parts with rigidity suitable for resistance of fatigue.

The three-link system, formed by brace members 35, 36, lends additional rigidity to the structure, part of which rigidity is also obtained from the region 57 (FIG. 3) between the two arcuate medial portions of the airframe members. Skid 58 may conveniently be attached to the front cross-member to complete the landing gear arrangement.

The foregoing described framework constitutes a rigid and rugged light weight frame work for a helicopter. The power plant can readily be attached to its foundation, and the rotors mounted to the rotor mounting plate and to the boom as is conventional in helicopters. These additional structures are well-known in the art and form no part of the invention, and are therefore not described here. The structure shown in the drawings is complete in itself as framework for supporting the passenger and his facilities, as well as the power plant and aerodynamic elements required for the craft to function.

It will be noted further that the legs of the respective pairs of side members generally extend and curve toward each other as they approach their free ends in order to reduce the bulk of the device and add styling and minimum cross-section to the structure.

The device is assembled with a minimum of welds and a minimum cost of tooling and assembly.

This invention is not to be limited by the embodiments shown in the drawings and described in the description, which is given by way of example and not of limitation, but only in accordance with the scope of the appended claims.

I claim:

1. A fuselage framework for a helicopter comprising: a pair of tubular forward airframe members; a pair of tubular rearward airframe members, each of said members comprising a continuous tube having a pair of leg sections connected by an arcuate medial section, with the legs forming an obtuse angle, the framework having a direction and axis of forward motion and a horizontal reference plane, the framework being generally symmetrical laterally of the said axis, the forward airframe members laying side by side and laterally spaced apart with their obtuse angles facing upwardly, their forward leg sections lying in the reference plane, and their rearward leg sections projecting upwardly, the rearward airframe members laying side by side and laterally spaced apart with their obtuse angle facing downwardly, with their forward leg sections directed downwardly toward said reference plane and their rearward leg sections lying above the reference plane and projecting rearwardly, the forward leg sections of each rearward airframe member being attached to the forward leg section of a respective forward airframe member at a location spaced from the forward end of said forward airframe member, and the rearward leg section of the said respective forward and rearward airframe members being attached to each other at locations remote from the ends of said rearward leg sections; a pair of brace members connecting the rearward leg sections of said respective forward and rearward airframe members at locations spaced from the last-named location whereby to form a rigid triangular structure with portions of the respective rearward leg sections; a plurality of rigid cross-members attached to, extending between, structurally connecting, and spacing apart the leg sections of the forward and rearward airframe members; a rearwardly extending tubular tail boom member attached to the rearward leg section of each of the rearward airframe members; and a tubular landing gear member attached to and projecting from each of the forward airframe members.

2. A framework according to claim 1 in which the brace members are attached to the respective ends of the leg sections, and a plate connects the ends of the rearward leg sections of the forward airframe member to serve as a rotor mount.

3. A framework according to claim 1 in which the attachment of the forward leg sections of the rearward airframe members to the forward airframe members is at the end of the said forward leg sections.

4. A framework according to claim 1 in which the landing gear members are generally arcuate, and project from the airframe members substantially in the reference plane, and in which a support member interconnects each of the airframe members to a respective adjacent landing gear member.

5. A framework according to claim 1 in which all respective leg sections of the pairs of airframe members laterally approach each other as they extend toward their ends remote from the arcuate medial sections.

6. A framework according to claim 1 in which a rigid foundation structure interconnects the rearward leg sections of the rearward airframe members to serve as a power plant mount.

7. A framework according to claim 2 in which the attachment of the forward leg sections of the rearward airframe members to the forward airframe members is at the end of the said forward leg sections.

8. A framework according to claim 7 in which the landing gear members are generally arcuate, and project from the airframe members substantially in the reference plane, and in which a support member interconnects each of the airframe members to a respective adjacent landing gear member.

9. A framework according to claim 8 in which all respective leg sections of the pairs of airframe members laterally approach each other as they extend toward their ends remote from the arcuate medial sections.

10. A framework according to claim 9 in which a rigid foundation structure interconnects the rearward leg sections of the rearward airframe members to serve as a power plant mount.

References Cited

UNITED STATES PATENTS

| | | | |
|---|---|---|---|
| 2,818,226 | 12/1957 | Hiller, Jr. et al. | 244—17.27 X |
| 2,827,251 | 3/1958 | Doman | 244—17.11 X |
| 2,973,923 | 3/1961 | Sznycer | 244—17.11 |
| 3,288,395 | 11/1966 | Krohncke | 244—17.17 |

MILTON BUCHLER, Primary Examiner

P. E. SAUBERER    Assistant Examiner

U.S. Cl. X.R.

244—120, 17.17